United States Patent
Hayes

(10) Patent No.: US 6,368,710 B1
(45) Date of Patent: Apr. 9, 2002

(54) SULFONATED ALIPHATIC-AROMATIC COPOLYESTERS

(75) Inventor: Richard Allen Hayes, Brentwood, TN (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/740,739

(22) Filed: Dec. 19, 2000

(51) Int. Cl.$^7$ .......................... D02G 3/00; C08G 63/02

(52) U.S. Cl. .................... 428/364; 528/295; 528/295.3; 528/296; 528/298; 528/300; 528/301; 528/302; 528/308; 528/308.6; 428/357

(58) Field of Search ............................. 528/295, 295.3, 528/296, 298, 300, 301, 302, 308, 308.6; 428/357, 364

(56) References Cited

U.S. PATENT DOCUMENTS

| | | | |
|---|---|---|---|
| 3,684,766 A | * | 8/1972 | Jackson, Jr. et al. |
| 5,164,478 A | * | 11/1992 | Lee et al. .................... 528/481 |
| 5,958,581 A | | 9/1999 | Khanarian et al. |
| 5,959,066 A | | 9/1999 | Charbonneau et al. |
| 6,025,061 A | | 2/2000 | Khanarian et al. |
| 6,063,464 A | * | 5/2000 | Charbonneau et al. ... 428/36.92 |
| 6,063,465 A | | 5/2000 | Charbonneau et al. |
| 6,063,495 A | | 5/2000 | Charbonneau et al. |
| 6,140,422 A | * | 10/2000 | Khanarian et al. .......... 525/176 |

FOREIGN PATENT DOCUMENTS

WO    WO 99-45054    9/1999

OTHER PUBLICATIONS

Chemical Abstracts vol. 62, col. 10588, Neth. App. 6,405, 497 (1965).
Encyclopedia Dictionary of Commercial Polymer Blends, Ed. L. A. Ultracki. Chemtec Publishing, pp. 10–11, 23, 35–43 (1994).
"Plastics Processing" McGraw–Hill Encyclopedia of Science & Technology, 6$^{th}$ Edition, pp. 35–40 (1987).
"Plastics Processing," The Way Things Work, vol. 2, pp. 56–59 (1971).
Polymer Alloys and Blends: Thermodynamics and Rheology, Ed. L. A. Ultracki, Hanser Publishers, pp. 256–270, 275–280, 287–293, 297–299 (1990).
Polymeric Materials Encyclopedia, "Polyesters (Derived From Renewable Sources)" vol. 8, pp. 5891–5896, CPC Press, Inc. (1996).
F. Bachmann, Et. Al., "Synthesis of a Novel Starch–Derived AB–Type Polyurethane", Macromol. Rapid Commun., 19, pp. 21–26 (1998).
D. Braun Et. Al., "Polyesters With 1.4:3.6–Dianhydrosorbitol as Polymeric Plasticizers for PVC", Die Angewante Makromolekulare Chemie 199, pp. 191–201 (1992).

Dietrich Braun, Et. Al., "1,4:3,6–Dianhydrohexite ALS Bausteine Fur Polymere", J. Prakt. Chem. 334, pp. 298–310 (1992).
D. Braun, Et Al., "Grafting of Polyesters by Free–Radical Chain Transfer," Die Angewandte Makromolekulare Chemie 210, pp. 173–196 (1993).
Estelle Cognet–Georjon, Et. Al., "New Polyurethanes Based on Diphenylmethane Diisocyanate and 1,4;3,6–Dianhydrosorbitol, 1," Macromol. Chem. Phys. 196, pp. 3733–3751 (1995).
Estelle Cognet–Georjon, Et. Al., "New Polyurethanes Based on 4,4'–Diphenylmethane Diisocyanate and 1,4:3,6 Dianydrosorbitol,2" Macromol. Chem. Phys. 197, pp. 3593–3612 (1996).
G. Fleche Et. Al., "Isosorbide Preparation, Properties and Chemistry", Starch/Staerke 38 (1), pp. 26–30 (1986).
Hans R. Kricheldorf, Et. Al., "Chiral Thermotropic Copoly-(Ester–Imide)s Based on Isosorbide and N–(4–Carboxyphenyl)Trimellitimide," Macromol. Rapid Commun. 16, pp. 231–237 (1995).
Masahiko Okada, Et. Al., "Biodegradable Polymers Based on Renewable Resources. IV. Enzymatic Degradation of Polyesters Composed of 1,4:3,6–Dianhydro–D–Glucitol and Aliphatic Dicarboxylic Acid Moieties.", J. Appl. Polym. Sci., 77(2), pp. 338–346 (2000).
Martin Reinecke, Et. Al., "Branching and Crosslinking of an Unsaturated Oligoester With Furfurylamides and Sorbic Acid Amides Via Diels–Alder Additions," Makromol. Chem. 194, pp. 2385–2393 (1993).
Masahiko Okada, Et. Al., Structure–Biodegradability Relationship of Polyesters Containing Furan Rings., Polym. Prepr. (Am. Chem. Soc., Div. Poly. Chem.), 39(20), pp. 152–153 (1998).
Reinhard Storbeck, Et. Al., "Synthesis and Properties of High–Molecular–Weight Polyesters Based on 1,4:3,6–Dianhydrohexitols and Terephthalic Acid," Makromol. Chem. 194, pp. 53–64 (1993).
Reinhard Storbeck, Et. Al., "Synthesis and Thermal Analysis of Copolyesters Deriving From 1,4:3,6–Dianhydrosorbitol, Ethylene Glycol, and Terephthalic Acid," Journal of Applied Polymer Science, vol. 59, pp. 1199–1202 (1996).
J. Thiem, Et. Al., "Darstellung Und Gezielte Polykondensation Von Anhydroalditol–Bausteinen Aus Starke", Starchs/Starke, 36, Nr. 5, pp. 170–176 (1984).

(List continued on next page.)

Primary Examiner—Samuel A. Acquah
(74) Attorney, Agent, or Firm—Charles E. Krukiel

(57) ABSTRACT

A sulfonated copolyester of the reaction product of: (a) one or more aromatic dicarboxylic acids or an ester thereof; (b) one or more aliphatic dicarboxylic acids or an ester thereof; (c) one or more sulfonated compound; and (d) isosorbide. The polyesters are useful to form articles of increased biodegradability.

20 Claims, No Drawings

OTHER PUBLICATIONS

Joachim Thiem, Et. Al., "Synthesis of Polyterephthalates Derived From Dianhydrohexitols," Polymer Bulletin 11, pp. 365–369 (1984).

Joachim Thiem, Et. Al., "Synthesis and Properties of Polyurethanes Derived From Diaminodianhydralditols", Makromol. Chem., 187, pp. 2775–2785 (1986).

Sirinat Wilbullucksanakul, Et. Al., "Synthesis of Polyurethanes From Saccharide–Derived Diols and Diisocyanates and Their Hydrolyzability," Macromol. Chem., Phys. 197, pp. 135–146 (1996).

Hans R. Kircheldorf, Et. Al., "LC–Polyimides 26. Photoreactive, Nematic or Cholesteric Poly(Ester–Imide)s Derived From 4–Aminocinnamic Acid Trimellitimide, Isosorbide, and Various Diphenols," High Perform. Polym., 7, pp. 471–480 (1995).

Hans R. Kricheldorf, Et. Al., "New Polymer Synthesis, LXXXII. Synthesis of Poly(Ethersulfones)s From Silylated Aliphatic Diols Including Chiral Monomers," Journal of Polymer Science: Part A: Polymer Chemistry, vol. 33, pp. 2667–2671 (1995).

Hans R. Kricheldorf, ""Sugar Diols" as Buidling Blocks of Polycondensates", J. M. S.—Rev. Macromol. Chem. Phys., C37(4), pp. 599–631 (1997).

Mustapha Majdoub, Et. Al., "Nouveaux Polyethers Et Polyesters a Base D'Isosorbide: Synthesis Et Caracterisation", Eur. Polym. J., vol. 30, No. 12, pp. 1431–1437, (1994).

Masahiko Okada, Et. Al., "Synthesis and Degradabilities of Polyesters From 1,4:3,6–Dianhydrohexitols and Aliphatic Dicarboxylic Acids", Journal of Poly. Sci.: Part A: Polym. Chem., vol. 33, pp. 2813–2820 (1995).

Masahiko Okada, Et. Al., "Biodegradable Polymers Based on Renewable Resources: Polyesters Composed of 1,4:3, 6–Dianhydrohexitol and Aliphatic Dicarboxylic Acid Units.", J. Appl. Polym. Sci., 62(13), pp. 2257–2265 (1996).

Masahiko Okada, Et. Al., "Biodegradable Polymers Based on Renewable Resources. III. Copolyesters Composed of 1,4:3,6–Dianhydro–D–Glucitol, 1,1–Bis(5–Carboxy–2–Furyl)Ethane and Aliphatic Dicarboxylic Acid Units.", J. Appl. Polym.Sci., 74(14), pp. 3342–3350 (1999).

* cited by examiner

SULFONATED ALIPHATIC-AROMATIC COPOLYESTERS

FIELD OF THE INVENTION

This invention relates to sulfonated copolyesters that can exhibit an improved rate of biodegradation more amenable to solid waste disposal. The invention also relates to methods of making and using the copolyesters.

BACKGROUND OF THE INVENTION

The inadequate treatment of municipal solid waste deposited in landfills and the increasing addition of nondegradable materials, including plastics, to municipal solid waste streams are combining to drastically reduce the number of landfills available and to increase the costs of municipal solid waste disposal. While recycling of reusable components of the solid waste is desirable in many instances, the costs of recycling and the infrastructure required to recycle materials is sometimes prohibitive. In addition, there are some products, which do not easily fit into the framework of recycling. One alternative approach is the composting of non-recyclable solid waste—a recognized and growing method to reduce solid waste volume for landfilling. Products from the composted waste can be used to improve the fertility of fields and gardens. However, one of the limitations to marketing such composted product is the visible contamination by undegraded plastic, such as film or fiber fragments.

Polymer components are sought that are useful in disposable products and which are degraded into less contaminating forms under the conditions typically existing in waste composting processes. It is further desirable to provide disposable components, which will not only degrade aerobically/anaerobically in composting, but will continue to degrade in the soil or landfill.

Polyesters have been considered for biodegradable articles and end-uses in the past. These biodegradable polyesters can be characterized as belonging to three general classes; aliphatic polyesters (polyesters derived solely from aliphatic dicarboxylic acids), aliphatic-aromatic polyesters (polyesters derived from a mixture of aliphatic dicarboxylic acids and aromatic dicarboxylic acids), and sulfonated polyesters derived from a mixture of aliphatic dicarboxylic acids and aromatic dicarboxylic acids and, in addition, incorporating a sulfonated monomer, such as the salts of 5-sulfoisophthalic acid.

A shortcoming of the above mentioned polyesters is that they often do not provide a composition which combines both high temperature characteristics, which are required by many enduses, such as dual ovenable food trays and the like, with a high rate of biodegradation, as desired to avoid the filling of landfills. It has been generally found that the biodegradation rate of the polyester may be enhanced through the addition of greater amounts of aliphatic dicarboxylic acids. At the same time, it has been generally found that the incorporation of such aliphatic dicarboxylic acids into a polyester composition tends to degrade the thermal properties of the polyester composition, as measured through the glass transition temperature, (Tg).

Isosorbide has been incorporated as a monomer into aliphatic and aromatic polyesters. A recent review is found in Hans R. Kricheldorf, et. al., J. M. S.-Rev. Macromol. Chem. Phys., C37(4), pp. 599–631 (1997). However it is generally believed that secondary alcohols such as isosorbide have poor reactivity and are sensitive to acid-catalyzed reactions.

One skilled in the art was thus confronted by three distinct art areas; (i) the sulfonated aliphatic-aromatic polyesters, which suffered from relatively low thermal properties, such as glass transition temperatures; (ii) the aliphatic isosorbide polyester art, which suffered from low molecular weights and thermal properties; and (iii) the aromatic isosorbide polyester art, which suffered from a low biodegradation rate.

SUMMARY OF THE INVENTION

The present invention has surprisingly found that the sulfonated aliphatic-aromatic isosorbide copolyesters of the present invention combine good molecular weight and thermal properties with improved biodegradability.

The present invention provides a sulfonated copolyester comprising the polymerization product of:

(a) one or more aromatic dicarboxylic acids or an ester thereof, (b) one or more aliphatic dicarboxylic acids or an ester thereof;

(c) one or more sulfonated compound; and (d) isosorbide.

The sulfonated aliphatic-aromatic copolyesters which incorporate isosorbide of the present invention are found to often avoid many of the shortcomings found in the art. The polymers of the invention can provide a combination of a higher biodegradation rate with higher thermal properties than found in the art.

Further objects, features and advantages of the invention will become apparent form the detailed description that follows.

DETAILED DESCRIPTION OF PREFERRED EMBODIMENTS

The copolyesters of the present invention include isosorbide, which is the diol 1,4:3,6-dianhydro-D-sorbitol. Isosorbide is readily made from renewable resources, such as sugars and starches. For example, isosorbide can be made from D-glucose by hydrogenation followed by acid-catalyzed dehydration. The preparation of isosorbide is known within the literature in, for example, G. Fleche, et. al., Starch/Starke, 38(1), pp. 26–30 (1986).

The terms glycol, diol and dihydric alcohol as used herein refer to similar general compositions of a primary, secondary or tertiary alcohol containing two hydroxyl groups and can be used interchangeably. The term glycol is more often used in the art to characterize low molecular weight alcohols such as ethylene glycol and propylene glycol. Diol and dihydric alcohol are typically applied to higher molecular weight alcohols, including polymeric diols.

Any aromatic dicarboxylic acid known in the art can be used. Useful aromatic dicarboxylic acids include unsubstituted and substituted aromatic dicarboxylic acids and the lower alkyl ($C_1$–$C_6$) esters of aromatic dicarboxylic acids; e.g., having from 8 carbons to 20 carbons. Examples of useful diacid moieties include those derived from terephthalates, isophthalates, naphthalates, and bibenzoates. Specific examples of useful aromatic dicarboxylic acid components include terephthalic acid, dimethyl terephthalate, isophthalic acid, dimethyl isophthalate, 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), and the like and mixtures of two or more thereof. Preferably, the aromatic dicarboxylic acid component is derived from terephthalic acid, dimethyl terephthalate, isophthalic acid, dimethyl isophthalate, 2,6-naphthalene dicarboxylic acid, dimethyl-2,6-naphthalate, or mixtures of two or more thereof.

Any aliphatic dicarboxylic acid known in the art can be used within the present invention. Useful aliphatic dicarboxylic acid components include unsubstituted ($C_1$–$C_6$), or substituted; linear, branched, or cyclic aliphatic dicarboxylic acids, and the lower alkyl esters thereof, preferably having 2–36 carbon atoms. Examples of useful aliphatic dicarboxylic acid components include, oxalic acid, dimethyl oxalate, malonic acid, dimethyl malonate, succinic acid, dimethyl succinate, methylsuccinc acid, glutaric acid, dimethyl glutarate, 2-methylglutaric acid, 3-methylglutaric acid, adipic acid, dimethyl adipate, 3-methyladipic acid, 2,2,5,5-tetramethylhexanedioic acid, pimelic acid, suberic acid, azelaic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, 1,4-cyclohexanedicarboxylic acid, dimethyl-1,4-cyclohexanedicarboxylate, 1,3-cyclohexanedicarboxylic acid, dimethyl-1,3-cyclohexanedicarboxylate, 1,1-cyclohexanediacetic acid, and the like and mixtures of two or more thereof. Preferred aliphatic acids or esters include succinic acid, dimethyl succinate, glutaric acid, dimethyl glutarate, adipic acid, demethyl adipate and dimer acid.

The copolyester polymer of the invention contains sulfo groups, as described, for example, by Griffing et. al., in U.S. Pat. No. 3,018,272, the disclosure of which is hereby incorporated by reference. The sulfo groups may be introduced in any desired manner, e.g., in aliphatic or aromatic monomers such as sulfonated aliphatic or aromatic dicarboxylic acids or may be introduced as end-groups by including monofunctional components containing a sulfonic acid moiety as a substituent. An example of an aliphatic sulfonate component include the metal salts of sulfosuccinic acid. Specific examples of aromatic sulfonate components that can be used as end-groups include the metal salts of 3-sulfobenzoic acid, 4-sulfobenzoic acid and 5-sulfosalicylic acid. Preferred are sulfonate components whereby the sulfonate salt group is attached to an aromatic dicarboxylic acid. The aromatic nucleus may be benzene, naphthalene, diphenyl, oxydiphenyl, sulfonyldiphenyl, methylenediphenyl, or the like. Preferably, the sulfonate monomer is the residue of a sulfonate-substituted phthalic acid, terephthalic acid, isophthalic acid or 2,6-naphthalenedicarboxylic acid. Most preferably, the sulfonate component is a metal salt of 5-sulfoisophthalic acid or the lower alkyl ($C_1$–$C_6$) esters of 5-sulfoisophthalate.

The metal salt may be formed from monovalent or polyvalent alkali metal ions, alkaline earth metal ions, or other metal ions and the like. The alkali metal ion is, for example, sodium, potassium or lithium. Alkaline earth metals such as magnesium are also useful. Other useful metal ions include the transition metal ions, such as zinc, cobalt, or iron The multivalent metal ions may be used when an increase in the melt viscosity of the sulfonated aliphatic-aromatic copolyesters is desired. End-use examples where such melt viscosity enhancements may prove useful are melt extrusion coatings, melt blown containers or film, and foam. As little as 0.1 mole percent of the sulfo group contributes significantly to the degradability characteristics of the resultant films or coatings. Preferably, the sulfo group is in the range of about 0.5 to about 5 mole percent level. However, higher levels of the sulfo group, for example from about 7 to about 10 mole percent, would tend to make the polyester resins of the present invention water sensitive and dispersible or soluble in water-based solvent systems, and hence can be used when such properties are desired.

The polymer can be formed with an optional glycol. Any glycol known in the art can be used as the optional dihydric alcohol of the invention. Examples include unsubstituted or substituted; straight chain, branched, cyclic aliphatic, aliphatic-aromatic, or aromatic diols having e.g., from 2 carbon atoms to 36 carbon atoms and poly(alkylene ether) glycols with molecular weights preferably between about 250 to about 4,000. Specific examples of the useful glycol component include ethylene glycol, 1,3-propanediol, 1,4-butanediol, 1,6-hexanediol, 1,8-octanediol, 1,10-decanediol, 1,12-dodecanediol, 1,14-tetradecanediol, 1,16-hexadecanediol, dimer diol, 4,8-bis(hydroxymethyl)-tricyclo[5.2.1.0/2.6]decane, 1,4-cyclohexanedimethanol, di(ethylene glycol), tri(ethylene glycol), poly(ethylene ether) glycols, poly(butylene ether) glycols and the like and mixtures of two or more. Preferred dihydric alcohols include ethylene glycol, 1,3-propanediol, 1,4-butanediol, 1,6-hexanediol and poly(ethylene ether) glycols.

The polymer may be formed from an optional polyfunctional branching agent, of which can include any material with three or more carboxylic acid functions, hydroxy functions or a mixture thereof. Specific examples of useful polyfunctional branching agent component include 1,2,4-benzenetricarboxylic acid (trimellitic acid), trimethyl-1,2,4-benzenetricarboxylate, 1,2,4-benzenetricarboxylic anhydride (trimellitic anhydride), 1,3,5-benzenetricarboxylic acid, 1,2,4,5-benzenetetracarboxylic acid (pyromellitic acid), 1,2,4,5-benzenetetracarboxylic dianhydride (pyromellitic anhydride), 3,3',4,4'-benzophenonetetracarboxylic dianhydride, 1,4,5,8-naphthalenetetracarboxylic dianhydride, citric acid, tetrahydrofuran-2,3,4,5-tetracarboxylic acid, 1,3,5-cyclohexanetricarboxylic acid, pentaerythritol, 2-(hydroxymethyl)1,3-propanediol, 2,2-bis(hydroxymethyl) propionic acid, and the like and mixtures of two or more thereof. The polyfunctional branching agent may be included when higher resin melt viscosity is desired for specific enduses. Examples of such end-uses include melt extrusion coatings, melt blown films or containers, foam and the like.

To give the desired physical properties, the sulfonated aliphatic-aromatic copolyesters which incorporate isosorbide of the present invention should preferably have an inherent viscosity, which is an indicator of molecular weight, of at least equal to or greater than about 0.15. More desirably, the inherent viscosity, (IV), of the aliphatic-aromatic copolyesters which include isosorbide will be equal to or greater than about 0.35 dL/g. IV is measured on a 0.5 percent (weight/volume) solution of the copolyester in a 50:50 (weight) solution of trifluoroacetic acid:dichloromethane solvent system at room temperature. Even higher inherent viscosity's are desirable for many other applications, such as films, bottles, sheet, molding resin, and the like. The polymerization conditions may be adjusted to obtain the desired inherent viscosity's up to at least about 0.5 and desirably higher than 0.65 dL/g. Further processing of the copolyester may achieve inherent viscosity's of 0.7, 0.8, 0.9, 1.0, 1.5, 2.0 dL/g and even higher.

The polyesters of the present invention can be prepared by conventional polycondensation techniques. The product compositions may vary somewhat based on the method of preparation used, particularly in the amount of diol that is present within the polymer. These methods include the reaction of the diol monomers with the acid chlorides. For example, acid chlorides of the aromatic dicarboxylic acid component and the aliphatic dicarboxylic acid component may be combined with the isosorbide and the other glycol component in a solvent, such as toluene, in the presence of a base, such as pyridine, which neutralizes the hydrochloric acid as it is produced. Such procedures are known. See, for example, R. Storbeck, et. al., J. Appl. Polymer Science, Vol. 59, pp. 1199–1202 (1996). Other well known variations using acid chlorides may also be used, such as an interfacial polymerization method, or the monomers may simply be stirred together while heating.

When the polymer is made using acid chlorides, the ratio of the monomer units in the product polymer is about the same as the ratio of reacting monomers. Therefore, the ratio of monomers charged to the reactor is about the same as the desired ratio in the product. An approximately stoichiometric equivalent of the diol components and the diacid components can be used to obtain a higher molecular weight polymer.

Preferably, the copolyesters are produced through a melt polymerization method. In the melt polymerization method, the aromatic dicarboxylic acid component, (either as acids, esters, or mixtures thereof), the aliphatic dicarboxylic acid component, (either as acids, esters, or mixtures thereof), the isosorbide, the sulfonated component, the other optional glycol component and optionally the polyfunctional branching agent, are combined in the presence of a catalyst at a temperature high enough such that the monomers combine to form esters and diesters, then oligomers, and finally polymers. The polymeric product at the end of the polymerization process is a molten product. Generally, the diol component and the isosorbide are volatile and distill from the reactor as the polymerization proceeds. Such procedures are known. See, for example, Charbonneau, et. al., in U.S. Pat. No. 6,063,464 and the references cited therein.

The melt process conditions of the present invention, particularly the amounts of monomers used, depend on the polymer composition that is desired. The amount of isosorbide, the other glycol or dihydric alcohol component, aromatic dicarboxylic acid component, aliphatic acid component, sulfonated component, and branching agent are desirably chosen so that the final polymeric product contains the desired amounts of the various monomer units, desirably with approximately equimolar amounts of monomer units derived from the respective diol and diacid components. Because of the volatility of some of the monomers, especially some of the glycol components and isosorbide, and depending on such variables as whether the reactor is sealed, (i.e.; is under pressure), the polymerization temperature ramp rate, and the efficiency of the distillation columns used in synthesizing the polymer, some of the monomers may need to be included in excess at the beginning of the polymerization reaction and removed by distillation as the reaction proceeds. This is particularly true of the glycol component and of isosorbide.

The amount of monomers to be charged to a particular reactor is readily determined by a skilled practitioner, but often will be in the ranges below. Excesses of the diacid, diol, and isosorbide are often desirably charged, and the excess diacid, diol and isosorbide is desirably removed by distillation or other means of evaporation as the polymerization reaction proceeds. Isosorbide is desirably charged at a level 20 to 100 percent greater than the desired incorporation level in the final polymer. The other optional glycol component is desirably charged at a level 0 to 100 percent greater than the desired incorporation level in the final product. For examples of the other glycol component which are volatile under the polymerization conditions, such as ethylene glycol, 1,3-propanediol, or 1,4-butanediol, 30 to 100 percent excesses are desirably charged. For less volatile examples of the other glycol component, such as dimer diol, no excesses need be desirably charged. Typically the diacid and sulfonated components are not added in excesses because they are not typically volatile. This, depends on the chemical nature and volatility of the specific materials chosen. Thus, depending on the specific material used, excess of diacid or sulfonated component can be used.

The ranges given below for the monomers vary because of the wide variation in the monomer loss during polymerization, depending on the efficiency of distillation columns and other kinds of recovery and recycle systems and the like. Exact amounts of monomers that are charged to a specific reactor to achieve a specific composition are readily determined by a skilled practitioner.

While the copolyesters can include any amount of the monomer, generally about 98 to about 20 mole percent, preferably about 90 to about 40 mole percent, more preferably about 80 to about 50 mole percent of aromatic dicarboxylic acid (based on total dicarboxylic acids); about 2 to about 80 mole percent, preferably about 10 to about 60 mole percent, more preferably about 20 to about 50 mole percent of aliphatic dicarboxylic acid (based on total dicarboxylic acids); about 0.1 to about 10 mole percent, preferably about 0.3 to about 5.0 mol percent, more preferably about 0.5 to about 2.5 mole percent of sulfonate compound (based on total glycols or total dicarboxylic acids, depending on the chemical functionality of the used sulfonate component, e.g., if the sulfonate component is dimethyl-5-sulfoisophthalate, sodium salt it is based on acids); about 100 to about 1 mole percent, preferably about 50 to about 2 mole percent, more preferably about 25 to about 5 mole percent of isosorbide (based on total glycols (diols)); and 0 to about 99 mole percent, preferably about 50 to about 98 mole percent, more referably about 75 to about 95 mole percent of other glycol (based on total glycols (diols)); and 0 to about 5 mole percent, preferably 0.5 to about 2.5 mole percent, more preferably about 1 to about 1.0 mole percent of polyfunctional branching agent (based on total glycols or total dicarboxylic acids, depending on the chemical functionality of the used polyfunctional branching agent); are used.

These ranges are for monomers incorporated into the polymer. For the reasons discussed above, the amount of monomer required to achieve the incorporation level desired will vary widely based on the nature of monomer chosen. This disparity between added monomer and monomer level incorporated is further demonstrated within the examples. For example, the incorporation rate of isosorbide can be at 50%, and other glycols, such as ethylene glycol, is typically added in 30 to 100 percent excesses.

In the polymerization process, the monomers are combined, and are heated generally with mixing with a catalyst or catalyst mixture to a temperature, generally in the range of 230° C. to about 300° C., desirably 250° C. to 295° C. The exact conditions and the catalysts depend, for example, on whether the diacids are polymerized as true acids or as dimethyl esters. The catalyst may be included initially with the reactants, and/or may be added one or more times to the mixture as it is heated. The catalyst used may be modified as the reaction proceeds. The heating and stirring are continued for a sufficient time and to a sufficient temperature, generally with removal by distillation of excess reactants, to yield a molten polymer having a high enough molecular weight to be suitable for making fabricated products.

Any desired catalyst may be used. Catalysts that may be used include salts of Li, Ca, Mg, Mn, Zn, Pb, Sb, Sn, Ge, and Ti, such as acetate salts and oxides, including glycol adducts, and Ti alkoxides. These are generally known in the art, and the specific catalyst or combination or sequence of catalysts used may be readily selected by a skilled practitioner. The preferred catalyst and preferred conditions differ depending on, for example, whether the diacid monomer is polymerized as the free diacid or as a dimethyl ester and the chemical identity of the other optional glycol component.

The monomer composition of the polymer is chosen for specific uses and for specific sets of properties. For uses where a partially crystalline polymer is desired, as for example food and beverage containers, such as hot fill or cold fill bottles, fibers, and films, the polymer will generally have a monomer composition in the range of about 1.0 to 10.0 mole percent, preferably about 1 to about 5 mole percent of isosorbide moieties, based on total glycol.

For applications where it is desirable to have an amorphous polymer, such as would be the case to make transparent optical articles or solvent soluble copolyesters, the amount of isosorbide moiety is generally greater than about 2.0 mole percent, again based on total glycol.

Polymers can be made by the melt condensation process described above having adequate inherent viscosity for many applications. Solid state polymerization may be used to achieve even higher inherent viscosity's (molecular weights).

The product made by melt polymerization, after extruding, cooling and pelletizing, may be essentially noncrystalline. Noncrystalline material can be made semicrystalline by heating it to a temperature above the glass transition temperature for an extended period of time. This induces crystallization so that the product can then be heated to a higher temperature to raise the molecular weight.

The polymer may also be crystallized prior to solid state polymerization by treatment with a relatively poor solvent for polyesters which induces crystallization. Such solvents reduce the glass transition temperature (Tg) allowing for crystallization. Solvent induced crystallization is known for polyesters and is described in U.S. Pat. Nos. 5,164,478 and 3,684,766.

The semicrystalline polymer can be subjected to solid state polymerization by placing the pelletized or pulverized polymer into a stream of an inert gas, usually nitrogen, or under a vacuum of about 1 Torr, at an elevated temperature, but below the melting temperature of the polymer for an extended period of time.

The present copolyesters are generally substantially biodegradable compared to other copolyesters known in the art. For example, when compared with comparable aromatic isosorbide polyesters known within the art which do not incorporate either aliphatic dicarboxylic acid component of the present invention or the sulfonate compound of the present invention, the sulfonated aliphatic-aromatic copolyesters which incorporate isosorbide of the present invention often have a biodegradation rate at least twice that found for the comparable aromatic isosorbide polyesters of the art, as can be measured by the below mentioned ISO 14855 composting method. Also, the sulfonated aliphatic-aromatic copolyesters which incorporate isosorbide of the present invention often have greater thermal properties, as can be measured by the glass transition temperature, (Tg), crystalline melting point, (T m), or heat deflection temperature, (HDT), then found for the corresponding aliphatic isosorbide polyesters and sulfonated aliphatic-aromatic polyesters of the art.

Some of the above described sulfonated aliphatic-aromatic copolyesters which incorporate isosorbide have both biodegradable and solvent solubility in common, non-halogenated, polar solvents. Examples of the non-halogenated, polar solvents include tetrahydrofuran, dimethyl acetamide, dimethyl formamide, N-methylpyrollidone, dimethylsulfoxide, and the like. Some of the aliphatic-aromatic copolyesters which incorporate isosorbide of the current invention are readily soluble in said solvents and the resulting polymer solutions provide clear films.

The copolyesters of the present invention may be used with additives known within the art. Such additives may include thermal stabilizers, for example, phenolic antioxidants, secondary thermal stabilizers, for example, thioethers and phosphites, UV absorbers, for example benzophenone- and benzotriazole-derivatives, UV stabilizers, for example, hindered amine light stabilizers (HALS), and the like. The additives may further include plasticizers, processing aides, flow enhancing additives, lubricants, pigments, flame retardants, impact modifiers, nucleating agents to increase crystallinity, antiblocking agents such as silica and the like. In addition, the compositions of the present invention may be filled with, for example, wood flour, gypsum, wollastonite, chalk, kaolin, clay, silicon oxide, calcium terephthalate, aluminum oxide, titanium oxide, calcium phosphate, lithium fluoride, cellulose, starch, chemically modified starch, thermoplastic starch, calcium carbonate, reinforcing agents, such as glass, and the like. The compositions of the present invention may also find use as a component of a polymer blend with other polymers, such as cellulose ethers, thermoplastic starch, poly(vinyl alcohol), and the like. Generally any additive or filler of the art can be used with the copolyesters of the present invention.

The sulfonated aliphatic-aromatic copolyesters which incorporate isosorbide of the present invention are useful within a wide variety of shaped biodegradable articles. The copolyesters may be solution or melt processed to form coatings, films and the like. Coatings may be produced by coating a substrate with polymer solutions of the copolyesters followed by drying, by coextruding the copolyesters with other materials, or by melt coating a preformed substrate with the polyesters of the present invention. The coatings derived from the copolyesters of the present invention have utility as barriers to moisture, oxygen, carbon dioxide and the like. The coatings derived from the copolyesters of the present invention also are useful as adhesives. Films of the copolyesters of the present invention may be produced by any known art method, including, for example, solution or melt casting.

Shaped articles include films, sheets, fibers, melt blown containers, molded parts, such as cutlery, foamed parts, polymeric melt extrusion coatings onto substrates, polymeric solution coatings onto substrates, and the like. The copolyesters may be solution or melt processed to form coatings, films and the like. Films of the copolyesters of the present invention may be produced by any known art method, including, for example, solution or melt casting.

Film or sheets are made from the polymer of the invention by any process known in the art. The difference between a film and a sheet is the thickness, but there is no set industry standard as to when a film becomes a sheet.

For purposes of this invention, a film is less than or equal to about 0.25 mm (10 mils) thick, preferably between about 0.025 mm and 0.15 mm (1 mil and 6 mils). However, thicker films can be formed up to a thickness of about 0.50 mm (20 mils).

The film of the present invention can be formed by either solution casting or extrusion as known in the art. Extrusion is particularly preferred for formation of "endless" products, such as films and sheets, which emerge as a continuous length. In extrusion, the polymeric material, whether provided as a molten polymer or as plastic pellets or granules, is fluidized and homogenized. This mixture is then forced through a suitably shaped die to produce the desired cross-sectional film shape. The extruding force may be exerted by a piston or ram (ram extrusion), or by a rotating screw (screw extrusion), which operates within a cylinder in which the material is heated and plasticized and from which it is then extruded through the die in a continuous flow. Single screw, twin screw, and multi-screw extruders may be used as known in the art. Different kinds of die are used to produce different products, such as blown film (formed by a blow head for blown extrusions), sheets and strips (slot dies) and hollow and solid sections (circular dies). In this manner, films of different widths and thickness may be produced, and, in some cases, such as when film is used as a coating, it may be extruded directly onto the object to be coated. For example, wires and cables can be sheathed directly with polymeric films extruded from oblique heads. As a further example, laminated paper coatings can be produced by melt extruding the polymer directly onto paperboard. After extrusion, the polymeric film is taken up on rollers, cooled and taken off by means of suitable devices which are designed to prevent any subsequent deformation of the film.

Using extruders as known in the art, film can be produced by extruding a thin layer of polymer over chilled rolls and then further drawing down the film to size by tension rolls. Preferably, the finished film is less than or equal to about 0.25 mm thick. Blown film, which is generally stronger, tougher, and made more rapidly than cast film, is made by extruding a tube. In producing blown film, the melt flow is turned upward from the extruder and fed through an annular die. As this tube leaves the die, internal pressure is introduced through the die mandrel with air, which expands the tube from about 1.5 to about 2.5 times the die diameter and simultaneously draws the film, causing a reduction in thickness. The resulting sleeve is subsequently slit along one side, making a larger film width than could be conveniently made via the cast film method. In extrusion coating, the substrate (paper, foil, fabric, polymeric film, and the like) is compressed together with the extruded polymeric melt by pressure rolls so that the polymer impregnates the substrate for maximum adhesion.

For manufacturing large quantities of film, a sheeting calendar can be employed. The rough film is fed into the gap of the calendar, a machine comprising a number of heatable parallel cylindrical rollers which rotate in opposite directions and spread out the polymer and stretch it to the required thickness. The last roller smoothes the film thus produced. If the film is required to have a textured surface, the final roller is provided with an appropriate embossing pattern. Alternatively, the film may be reheated and then passed through an embossing calendar. The calendar is followed by one or more cooling drums. Finally, the finished film is reeled up.

Alternatively, as mentioned previously, a supporting material may be coated directly with a film. For example, textile fabrics, paper, cardboard, metals, various building materials and the like, may be coated directly with the polyester polymer for the purpose of electrical insulation, protection against corrosion, protection against the action of moisture or chemicals, impermeability to gases and liquids, or increasing the mechanical strength. One process to achieve this is referred to as melt extrusion of the polymeric melt onto a substrate. Coatings are applied to textiles, foil, and other sheet materials by continuously operating spread-coating machines. A coating knife, such as a "doctor knife", ensures uniform spreading of the coating materials (in the form of solution, emulsions, or dispersions in water or an organic medium) on the supporting material, which is moved along by rollers. The coating is then dried. Alternatively, when the coating is applied to the supporting material in the form of a polymeric film, the process is called laminating.

Metal articles of complex shapes can also be coated with the polymeric film by the whirl sintering process. The articles, heated to above the melting point of the polymer, are introduced into a fluidized bed of powdered polymer wherein the polymer particles are held in suspension by a rising stream of air, thus depositing a coating on the metal by sintering.

Extruded films may also be used as the starting material for other products. For example, the film may be cut into small segments for use as feed material for other processing methods, such as injection molding.

The extrusion process can be combined with a variety of post-extruding operations for expanded versatility. Such post-forming operations include altering round to oval shapes, blowing the film to different dimensions, machining and punching, biaxial stretching and the like, as known to those skilled in the art.

The polymeric film of the invention may be combined with other polymeric materials during extrusion and/or finishing to form laminates or multilayer films with improved characteristics, such as water vapor resistance. In particular, the polymeric film of the invention may be combined with one or more of the following: poly(ethylene terephthalate) (PET), aramid, polyethylene sulfide (PES), polyphenylene sulfide (PPS), polyimide (PI), polyethylene imine (PEI), poly(ethylene naphthalate) (PEN), polysulfone (PS), polyether ether ketone (PEEK), olefins, polyethylene, poly(cyclic olefins), cellulose, and cyclohexylene dimethylene terephthalate, for example. A multilayer or laminate film may be made by any method known in the art, and may have as many as five or more separate layers joined together by heat, adhesive and/or tie layer, as known in the art.

A film may also be made by solution casting, which produces more consistently uniform gauge film than that made by melt extrusion. Solution casting comprises dissolving polymeric granules, powder or the like in a suitable solvent with any desired formulant, such as a plasticizer or colorant. The solution is filtered to remove dirt or large particles and cast from a slot die onto a moving belt, preferably of stainless steel, dried, whereon the film cools.

The extrudate thickness is five to ten times that of the finished film. The film may then be finished in a like manner to the extruded film.

Regardless of how the film is formed, it is desirably subjected to biaxial orientation by stretching in both the machine and transverse direction after formation. The machine direction stretch is initiated in forming the film simply by rolling out and taking up the film. This inherently stretches the film in the direction of takeup, orienting some of the fibers. Although this strengthens the film in the machine direction, it allows the film to tear easily in the direction at right angles because all of the fibers are oriented in one direction.

Biaxial stretching orients the fibers parallel to the plane of the film, but leaves the fibers randomly oriented within the plane of the film. This provides superior tensile strength, flexibility, toughness and shrinkability, for example, in comparison to non-oriented films. It is desirable to stretch the film along two axes at right angles to each other. This increases tensile strength and elastic modulus in the directions of stretch. It is most desirable for the amount of stretch in each direction to be roughly equivalent, thereby providing similar properties or behavior within the film when tested from any direction. However, certain applications, such as those desiring a certain amount of shrinkage or greater strength in one direction over another, as in labels or adhesive and magnetic tapes, will require uneven, or uniaxial, orientation of the fibers of the film.

The biaxial orientation may be obtained by any process known in the art. However, tentering is preferred, wherein the material is stretched while heating in the transverse direction simultaneously with, or subsequent to, stretching in the machine direction.

Shrinkage can be controlled by holding the film in a stretched position and heating for a few seconds before quenching. This heat stabilizes the oriented film, which then may be forced to shrink only at temperatures above the heat stabilization temperature.

The above process conditions and parameters for film making are determined by a skilled artisan for any given polymeric composition and desired application.

The properties exhibited by a film will depend on several factors including the polymeric composition, the method of forming the polymer, the method of forming the film, and whether the film was treated for stretch or biaxially oriented. These factors affect many properties of the film, such as shrinkage, tensile strength, elongation at break, impact strength, dielectric strength and constant, tensile modulus, chemical resistance, melting point, heat deflection temperature, and the like.

The film properties may be further adjusted by adding certain additives and fillers to the polymeric composition, such as colorants, dyes, UV and thermal stabilizers, antioxidants, plasticizers, lubricants antiblock agents, slip agents, and the like, as recited above. Alternatively, the copolyesters of the present invention may be blended with one or more other polymers, such as starch, to improve certain characteristics.

The biodegradable films of the present invention can be used e.g., in packaging, especially of foodstuff, adhesives, insulators, capacitors, photographic development, x-ray development, and as laminates. For many of these uses, the heat resistance of the film is an important factor. Thus, the higher melting point and Tg of the present polyesters are desirable.

The present invention also includes biodegradable shaped articles in the form of sheets produced from sulfonated aliphatic-aromatic copolyesters.

Biodegradable polymeric sheets have a variety of uses, such as in signage, glazings, thermoforming articles, displays and display substrates, for example. For many of these uses, the heat resistance of the sheet is an important factor. Therefore, a higher melting point and glass transition temperature are desirable to provide better heat resistance and greater stability. Further, it is desired that these sheets have ultraviolet (UV) and scratch resistance, good tensile strength, high optical clarity, and a good impact strength, particularly at low temperatures.

The copolyesters of the present invention may be formed by one of the above methods, or by any other method known in the art, they may be formed into sheets directly from the polymerization melt. In the alternative, the copolyester may be formed into an easily handled shape (such as pellets) from the melt, which may then be used to form a sheet. The sheet of the present invention can be used for forming signs, glazings (such as in bus stop shelters, sky lights or recreational vehicles), displays, automobile lights and in thermoforming articles, for example.

The difference between a sheet and a film is the thickness, but there is no set industry standard as to when a film becomes a sheet. For purposes of this invention, a sheet is greater than about 0.25 mm (10 mils) thick, preferably between about 0.25 mm and 25 mm, more preferably from about 2 mm to about 15 mm, and even more preferably from about 3 mm to about 10 mm. In a preferred embodiment, the sheets of the present invention have a thickness sufficient to cause the sheet to be rigid, which generally occurs at about 0.50 mm and greater. However, sheets greater than 25 mm, and thinner than 0.25 mm may be formed.

Sheets may be formed by any process known in the art, such as extrusion, solution casting or injection molding. The parameters for each of these processes can be determined by one of ordinary skill in the art depending upon viscosity characteristics of the copolyester and the desired thickness of the sheet.

The sheet of the present invention is preferably formed by either solution casting or extrusion. Extrusion is particularly preferred for formation of "endless" products, such as films and sheets, which emerge as a continuous length. For example, see applications WO 96/38282 and WO 97/00284, which describe the formation of crystallizable sheets by melt extrusion.

In extrusion, the polymeric material, whether provided as a molten polymer or as plastic pellets or granules, is fluidized and homogenized. This mixture is then forced through a suitably shaped die to produce the desired cross-sectional sheet shape. The extruding force may be exerted by a piston or ram (ram extrusion), or by a rotating screw (screw extrusion), which operates within a cylinder in which the material is heated and plasticized and from which it is then extruded through the die in a continuous flow. Single screw, twin screw, and multi-screw extruders may be used as known in the art. Different kinds of die are used to produce different products, such as sheets and strips (slot dies) and hollow and solid sections (circular dies). In this manner, sheets of different widths and thickness may be produced. After extrusion, the polymeric sheet is taken up on rollers, cooled and taken off by suitable devices which are designed to prevent any subsequent deformation of the sheet.

Using extruders as known in the art, a sheet can be produced by extruding a thin layer of polymer over chilled rolls and then further drawing down the sheet to size by tension rolls. Preferably, the finished sheet is greater than 0.25 mm thick.

For manufacturing large quantities of sheets, a sheeting calendar can be employed. The rough film is fed into the gap of the calendar, a machine comprising a number of heatable parallel cylindrical rollers which rotate in opposite directions and spread out the polymer and stretch it to the required thickness. The last roller smoothes the sheet thus produced. If the sheet is required to have a textured surface, the final roller is provided with an appropriate embossing pattern. Alternatively, the sheet may be reheated and then passed through an embossing calendar. The calendar is followed by one or more cooling drums. Finally, the finished sheet is reeled up.

The above extrusion process can be combined with a variety of post-extruding operations for expanded versatility. Such post-forming operations include altering round to oval shapes, stretching the sheet to different dimensions, machining and punching, biaxial stretching and the like, as known to those skilled in the art.

The polymeric sheet of the invention may be combined with other polymeric materials during extrusion and/or finishing to form laminates or multilayer sheets with improved characteristics, such as water vapor resistance. These are discussed above with reference to films.

A sheet may also be made by solution casting as discussed above.

Further, sheets and sheet-like articles, such as discs, may be formed by injection molding by any method known in the art.

Shrinkage can be controlled by holding the sheet in a stretched position and heating for a few seconds before quenching. This heat stabilizes the oriented sheet, which then may be forced to shrink only at temperatures above the heat stabilization temperature.

The above process conditions and parameters for sheet making can be determined by a skilled artisan for any given polymeric composition and desired application.

The properties exhibited by a sheet will depend on several factors including the polymeric composition, the method of forming the polymer, the method of forming the sheet, and whether the sheet was treated for stretch or biaxially oriented. These factors affect many properties of the sheet, such as shrinkage, tensile strength, elongation at break, impact strength, dielectric strength and constant, tensile modulus, chemical resistance, melting point, heat deflection temperature, and the like.

The sheet properties may be further adjusted by adding certain additives and fillers to the polymeric composition, such as colorants, dyes, UV and thermal stabilizers, antioxidants, plasticizers, lubricants antiblock agents, slip agents, and the like, as recited above. Alternatively, the copolyesters of the present invention may be blended with one or more other polymers, such as starch, to improve certain characteristics. Other polymers may be added to change such characteristics as air permeability, optical clarity, strength and/or elasticity, for example.

The sheets of the present invention may be thermoformed by any known method into any desirable shape, such as covers, skylights, shaped greenhouse glazings, displays, food trays, and the like. The thermoforming can be accomplished by heating the sheet to a sufficient temperature and for sufficient time to soften the copolyester so that the sheet can be easily molded into the desired shape. In this regard, one of ordinary skill in the art can determine the optimal thermoforming parameters depending upon the viscosity and crystallization characteristics of the polyester sheet.

A further specific aspect of the present invention includes biodegradable shaped articles in the form of containers produced from the copolyesters the containers may be made by any method known in the art, such as extrusion, injection molding, injection blow molding, rotational molding, thermoforming of a sheet, and stretch-blow molding.

A preferred method for molding a container is stretch-blow molding. In this case, use may be made of any of the cold parison methods, in which a preformed parison (generally made by injection molding) is taken out of the mold and then subjected to stretch blow molding in a separate step. The hot parison method as known in the art may also be used, wherein the hot parison is immediately subjected to stretch blow molding in the same equipment without complete cooling after injection molding to make the parison. The parison temperature will vary based on the composition of the polymer to be used. Generally, parison temperatures in the range from about 90° to about 160° C. are found useful. The stretch blow molding temperature will also vary dependant on the material composition used, but a mold temperature of about 80° C. to about 150° C. is generally found to be useful.

Containers of the invention may have any shape desirable, and particularly include narrow-mouth bottles and wide-mouth bottles having threaded tops and a volume of about 400 mL to about 3 liters, although smaller and larger containers may be formed.

The containers can be used in standard cold fill applications. For some of the compositions of the present invention, hot fill applications may also be used.

The containers of the invention are suitable for foods and beverages, and other solids and liquids. The containers are normally clear and transparent, but can be modified to have color or to be opaque, rather than transparent, if desired, by adding colorants or dyes, or by causing crystallization of the polymer, which results in opaqueness.

A further specific aspect of the present invention includes biodegradable shaped articles in the form of fiber produced from the sulfonated aliphatic-aromatic copolyesters which incorporate isosorbide.

Polyester fibers are produced in large quantities for use in a variety of applications. In particular, these fibers are desirable for use in textiles, particularly in combination with natural fibers such as cotton and wool. Clothing, rugs, and other items may be fashioned from these fibers. Further, polyester fibers are desirable for use in industrial applications due to their elasticity and strength. In particular, they are used to make articles such as tire cords and ropes.

The term "fibers" as used herein is meant to include continuous monofilaments, non-twisted or entangled multifilament yarns, staple yarns, spun yarns, and non-woven materials. Such fibers may be used to form uneven fabrics, knitted fabrics, fabric webs, or any other fiber-containing structures, such as tire cords.

The monomer composition of the copolyester of the present invention when used in fiber is desirably chosen to result in a partially crystalline polymer. The crystallinity is desirable for the formation of fibers, providing strength and elasticity. As first produced, the polyester is mostly amorphous in structure. In preferred embodiments, the polyester polymer readily crystallizes on reheating and/or extension of the polymer.

Fibers are made from the polymer by any process known in the art. Generally, melt spinning is preferred. Melt spinning comprises heating the polymer to form a molten liquid, or melting the polymer against a heated surface. The molten polymer is forced through a spinneret with a plurality of fine holes. Upon contact with air or a non-reactive gas stream after passing through the spinneret, the polymer solution from each spinneret solidifies into filaments. The filaments are gathered together downstream from the spinneret by a convergence guide, and may be taken up by a roller or a plurality of rollers. This process allows filaments of various sizes and cross sections to be formed, including filaments having a round, elliptical, square, rectangular, lobed or dog-boned cross section, for example.

Following the extrusion and uptake of the fiber, the fiber is usually drawn, thereby increasing the crystallization and maximizing desirable properties such as orientation along the longitudinal axis, which increases elasticity, and strength. The drawing may be done in combination with takeup by using a series of rollers, some of which are generally heated, as known in the art, or may be done as a separate stage in the process of fiber formation.

The polymer may be spun at speeds of from about 600 to 6000 meters per minute or higher, depending on the desired fiber size. For textile applications, a fiber with a denier per filament of from about 0.1 to about 100 is desired. Preferably, the denier is about 0.5 to 20, more preferably 0.7 to 10. However, for industrial applications the fiber should be from about 0.5 to 100 denier per filament, preferably about 1.0 to 10.0, most preferably 3.0 to 5.0 denier per filament. The required size and strength of a fiber can be readily be determined by one of ordinary skill in the art for any given application.

The resulting filmentary material is amenable to further processing through the use of additional processing equipment, or it may be used directly in applications requiring a continuous filament textile yarn. If desired, the filamentary material subsequently may be converted from a flat yarn to a textured yarn through known false twist texturing conditions or other processes known in the art. In particular, it is desirable to increase the surface area of the fiber to provide a softer feel and to enhance the ability of the fibers to breathe, thereby providing better insulation and water retention in the case of textiles, for example. The fibers may therefore be crimped or twisted by the false twist method, air jet, edge crimp, gear crimp, or stuffer box, for example. Alternatively, the fibers may be cut into shorter lengths, called staple, which may be processed into yarn. A skilled artisan can determine the best method of crimping or twisting based on the desired application and the composition of the fiber.

After formation, the fibers are finished by any method appropriate to the desired final use. In the case of textiles, this may include dyeing, sizing, or addition of chemical agents such as anitstatic agents, flame retardants, UV light stabilizers, antioxidants, pigments, dyes, stain resistants, antimicrobial agents and the like, which are appropriate to adjust the look and hand of the fibers. For industrial applications, the fibers may be treated to impart additional desired characteristics such as strength, elasticity or shrinkage, for example.

The continuous filament fiber of the invention may be used either as produced or texturized for use in a variety of applications such as textile fabrics for apparel and home furnishings, for example. High tenacity fiber can be used in industrial applications such as high strength fabrics, tarpaulins, sail cloth, sewing threads and rubber reinforcement for tires and V-belts, for example.

The staple fiber of the invention may be used to form a blend with natural fibers, especially cotton and wool. In particular, the polyester is a chemically resistant fiber which is generally resistant to mold, mildew, and other problems inherent to natural fibers. The polyester fiber further provides strength and abrasion resistance and lowers the cost of material. Therefore, it is ideal for use in textiles and other commercial applications, such as for use in fabrics for apparel, home furnishings and carpets.

Further, the polyester polymer of the invention may be used with another synthetic or natural polymer to form heterogenous fiber, thereby providing a fiber with improved properties. The heterogenous fiber may be formed in any suitable manner, such as side-by-side, sheath-core, and matrix designs, as is known within the art.

A further specific aspect of the present invention includes biodegradable shaped foamed articles produced from the sulfonated aliphatic-aromatic copolyesters which incorporate isosorbide.

The polyesters of the present invention may be readily foamed by a wide variety of methods known in the art. These include the injection of an inert gas such as nitrogen or carbon dioxide into the melt during extrusion or molding operations. Alternatively, inert hydrocarbon gases such as methane, ethane, propane, butane, and pentane, or chlorofluorocarobons, hydrochlorofluorocarbons, hydrofluorocarbons, and the like may be used. Another method involves the dry blending of chemical blowing agents with the polyester and then extruding or molding the compositions to provide foamed articles. During the extrusion or molding operation, an inert gas such as nitrogen is released from the blowing agents and provides the foaming action. Typical blowing agents include azodicaronamide, hydrazocarbonamide, dinitrosopentamethylenetetramine, p-toluenesulfonyl hydrazodicarboxylate, 5-phenyl-3,6-dihydro-1,3,4-oxa-diazin-2-one, sodium borohydride, sodium bicarbonate, 5-phenyltetrazole, p,p'-oxybis (benzenesulfonylhydrazide) and the like. Still another method involves the blending of sodium carbonate or sodium bicarbonate with one portion of the polyester pellets, blending of an organic acid, such as citric acid, with another portion of the polyester pellets and then blending of the two types of pellets through extrusion or molding at elevated temperatures. Carbon dioxide gas is released from the interaction of the sodium carbonate and citirc acid to provide the desired foaming action in the polymeric melt.

It is often desirable that the foamable polyester compositions incorporate nucleation agents to create sites for bubble initiation, influence the cell size of the foamed sheet or object and to hasten the soldification of the as foamed article. Examples of said nucleation agents include sodium acetate, talc, titanium dioxide, polyolefin materials such as polyethylene, polypropylene, and the like.

As described above, the foamable polyester compositions may include a wide variety of additives, fillers, or be blended with other materials. For biodegradable foams, the addition of cellulose, cellulose derivatives, such as chemically modified cellulose, starch, and starch derivatives, such as chemically modified starch and thermoplastic starch, is especially preferred.

The following Examples are presented to illustrate the preparation and properties of the sulfonated copolyester polymers of the invention. Comparative Examples are described, i.e., CE1, CE2 and CE3. Prophetic Examples E1–E21 describe copolyesters and copolymerization methods of the invention as well as the expected biodegradable and mechanical properties of the sulfonated copolyesters of the invention.

COMPARATIVE EXAMPLES AND PROPHETIC EXAMPLES

Test Methods

Differential Scanning Calorimetry, (DSC), is performed on a TA Instruments Model Number 2920 machine. Samples are heated under a nitrogen atmosphere at a rate of 20° C./minute to 300° C., programmed cooled back to room temperature at a rate of 20° C./minute and then reheated to 300° C. at a rate of 20° C./minute. The observed sample glass transition temperature, (Tg), and crystalline melting temperature, (Tm), noted below are from the second heat.

Inherent Viscosity, (IV), is defined in "Preparative Methods of Polymer Chemistry", W. R. Sorenson and T. W. Campbell, 1961, p. 35. It is determined at a concentration of 0.5 g./100 mL of a 50:50 weight percent trifluoroacetic acid:dichloromethane acid solvent system at room temperature by a Goodyear R-103B method.

Biodegradation is performed according to the ISO 14855 method: "Determination of the ultimate aerobic biodegradability and disintegration of plastic materials under controlled composting conditions—Method by analysis of evolved carbon". This test involved injecting an inoculum consisting of a stabilized and mature compost derived from the organic fraction of municipal solid waste with ground powder of the polymer to be tested, composting under standard conditions at an incubation temperature controlled at 58° C.±2° C. The test is conducted with one polymer sample. The carbon dioxide evolved is used to determine the extent of biodegradation.

Comparative Example CE1

To a 200 gallon autoclave is charged dimethyl terephthalate, (126.16 pounds), ethylene glycol, (78.0 pounds), manganese(II) acetate tetrahydrate, (37.65 grams), and antimony(III) trioxide, (13.6 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at 275° C. under fill vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is found to have an IV greater than 0.35 dL/g.

The above prepared polymer is ground to powder and subjected to a biodegradation test as detailed above.

Comparative Example CE2

To a 200 gallon autoclave is charged dimethyl terephthalate, (126.16 pounds), isosorbide, (9.5 pounds), ethylene glycol, (73.4 pounds), manganese(II) acetate tetrahydrate, (37.65 grams), and antimony(III) trioxide, (13.6 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at 275° C. under full vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is found to have an IV greater than 0.35 dL/g.

The polymer is analyzed for composition with proton NMR and found to essentially incorporate 5 mole percent isosorbide, (based on total glycols). This indicates that 50 percent of the added isosorbide is incorporated within the polymer.

The above prepared polymer is ground to powder and subjected to a As biodegradation test as detailed above.

Example 1

To a 200 gallon autoclave is charged dimethyl terephthalate (98.4 pounds), dimethyl 5-sulfoisophthalate, sodium salt (3.8 pounds), dimethyl succinate (19.0 pounds), isosorbide (9.5 pounds), ethylene glycol (73.4 pounds), manganese(II) acetate tetrahydrate (37.65 grams), and antimony(III) trioxide (13.6 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at 275° C. under full vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is found to have an IV greater than 0.35 dL/g.

The polymer is analyzed for composition with proton NMR and found to incorporate 5 mole percent isosorbide, (based on total glycols) and 20 mole percent succinate, (based on total diacids). This indicates that 50 percent of the added isosorbide is incorporated within the polymer.

The above prepared polymer is ground to powder and subjected to a biodegradation test as detailed above. This copolyester of the present invention is expected to have a biodegradation rate at least twice that of the polymers from Comparative Example 1 and Comparative Example 2.

Example 2

To a 200 gallon autoclave is charged dimethyl terephthalate (98.4 pounds), dimethyl 5-sulfoisophthalate sodium salt (3.8 pounds), dimethyl glutarate (20.8 pounds), isosorbide (9.5 pounds), ethylene glycol (73.4 pounds), manganese(II) acetate tetrahydrate (37.65 grams), and antimony(III) trioxide (13.6 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at 275° C. under full vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is expected to have an IV greater than 0.35 dL/g.

The polymer is analyzed for composition with proton NMR and found to incorporate 5 mole percent isosorbide, (based on total glycols) and 20 mole percent glutarate, (based on total diacids). This indicates that 50 percent of the added isosorbide is incorporated within the polymer.

The above prepared polymer is ground to powder and subjected to a biodegradation test as detailed above. This copolyester of the present invention is expected to have a biodegradation rate at least twice that of the polymers from Comparative Example 1 and Comparative Example 2

Example 3

To a 200 gallon autoclave is charged dimethyl terephthalate (98.4 pounds), dimethyl 5-sulfoisophthalate, sodium salt (3.8 pounds), dimethyl adipate (22.6 pounds), isosorbide (9.5 pounds), ethylene glycol (73.4 pounds), manganese(II) acetate tetrahydrate (37.65 grams), and antimony(II) trioxide, (13.6 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at 275° C. under full vacuum, (pressure equal to or less than 2 mm Hg), for 4 hours. The vacuum is then released and the resulting reaction mixture is extruded out of the autoclave as a ribbon. The polymer ribbon is cooled and chopped.

The polymer is tested for inherent viscosity, as described above and is found to have an IV greater than 0.35 dL/g. This polymer is tested for glass transition temperature by the above mentioned DSC test.

The polymer is analyzed for composition with proton NMR and found to incorporate 5 mole percent isosorbide, (based on total glycols) and 20 mole percent adipate, eased on total diacids). This would suggest that 50 percent of the added isosorbide is incorporated within the polymer.

The above prepared polymer is ground to powder and subjected to a biodegradation test as detailed above. This copolyester of the present invention is expected to have a biodegradation rate at least twice that of the polymers from Comparative Example 1 and Comparative Example 2

Comparative Example CE3

To a 200 gallon autoclave is charged dimethyl adipate (113.2 pounds), isosorbide (9.5 pounds), ethylene glycol (73.4 pounds), manganese(II) acetate tetrahydrate (37.65 grams), and antimony(II) trioxide (13.6 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at 275° C. under full vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is found to have an IV greater t 0.35 dL/g. This polymer is tested for glass transition temperature (Tg) by the above mentioned DSC test. The product from Comparative Example CE 3 is found to have a Tg significantly below the Tg found for the product from Example 3.

The polymer is analyzed for composition with proton NMR and found to incorporate 5 mole percent isosorbide, (based on total glycols). This indicates that 50 percent of the added isosorbide is incorporated within the polymer.

Comparative Example CE4

To a 200 gallon autoclave is charged dimethyl terephthalate (98.4 pounds), dimethyl 5-sulfoisophthalate, sodium salt (3.8 pounds), dimethyl adipate (22.6 pounds), ethylene glycol, (81.1 pounds), manganese(II) acetate tetrahydrate, (37.65 grams), and antimony(III) trioxide, (13.6 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at 275° C. under full vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is found to have an IV greater than 0.35 dL/g. This polymer is tested for glass transition temperature by the above mentioned DSC test. The product from Comparative Example CE4 is found to have a Tg significantly below the Tg found for the product from Example 3.

The polymer is analyzed for composition with proton NMR and found to incorporate 20 mole percent adipate, (based on total diacids).

Example 4

To a 200 gallon autoclave is charged dimethyl terephthalate (98.4 pounds), dimethyl 5-sulfoisophthalate, sodium salt (3.8 pounds), dimethyl adipate (22.6 pounds), isosorbide (19.0 pounds), ethylene glycol (61.3 pounds), manganese(II) acetate tetrahydrate (37.65 grams), and antimony(III) trioxide, (13.6 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at 275° C. under full vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is found to have an IV greater than 0.35 dL/g.

The polymer is analyzed for composition with proton NMR and found to incorporate 10 mole percent isosorbide, (based on total glycols) and 20 mole percent adipate, (based on total diacids). This would suggest that 50 percent of the added isosorbide is incorporated within the polymer.

The above prepared polymer is ground to powder and subjected to a biodegradation test as detailed above. This copolyester of the present invention is expected to have a biodegradation rate at least twice that of the polymers from Comparative Example 1 and Comparative Example 2.

Example 5

To a 200 gallon autoclave is charged dimethyl terephthalate (98.4 pounds), dimethyl 5-sulfoisophthalate, sodium salt (3.8 pounds), dimethyl adipate (22.6 pounds), isosorbide (28.5 pounds), ethylene glycol (53.6 pounds), manganese(II) acetate tetrahydrate (37.65 grams), and antimony(III) trioxide (13.6 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at 275° C. under full vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is found to have an IV greater than 0.35 dL/g.

The polymer is analyzed for composition with proton NMR and found to incorporate 15 mole percent isosorbide, (based on total glycols) and 20 mole percent adipate, (based on total diacids). This would suggest that 50 percent of the added isosorbide is incorporated within the polymer.

The above prepared polymer is ground to powder and subjected to a biodegradation test as detailed above. This copolyester of the present invention is expected to have a biodegradation rate at least twice that of the polymers from Comparative Example 1 and Comparative Example 2.

Example 6

To a 200 gallon autoclave is charged dimethyl terephthalate (98.4 pounds), dimethyl 5-sulfoisophthalate, sodium salt (3.8 pounds), dimethyl adipate (22.6 pounds), isosorbide (38.0 pounds), ethylene glycol (46.0 pounds), manganese(II) acetate tetrahydrate, (37.65 grams), and antimony(III) trioxide (13.6 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at 275° C. under full vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is found to have an IV greater than 0.35 dL/g.

The polymer is analyzed for composition with proton NMR and found to incorporate 20 mole percent isosorbide, (based on total glycols) and 20 mole percent adipate, (based on total diacids). This would suggest that 50 percent of the added isosorbide is incorporated within the polymer.

The above prepared polymer is ground to powder and subjected to a biodegradation test as detailed above. This copolyester of the present invention is expected to have a biodegradation rate at least twice that of the polymers from Comparative Example 1 and Comparative Example 2.

Example 7

To a 200 gallon autoclave is charged dimethyl terephthalate (98.1 pounds), dim ethyl 5-sulfoisophthalate, sodium salt, (3.8 pounds), dimethyl succinate (19.0 pounds), trimethyl 1,2,4-benzenetricarboxylate (0.4 pounds), isosorbide (9.5 pounds), ethylene glycol (73.4 pounds), manganese(II) acetate tetrahydrate, (37.65 grams), and antimony(III) trioxide, (13.6 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at 275 C. under full vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is found to have an IV greater than 0.35 dL/g.

The polymer is analyzed for composition with proton NMR and found to incorporate 5 mole percent isosorbide, (based on total glycols) and 20 mole percent succinate, (based on total diacids). This would suggest that 50 percent of the added isosorbide is incorporated within the polymer.

The above prepared polymer is ground to powder and subjected to a biodegradation test as detailed above. This copolyester of the present invention is expected to have a biodegradation rate at least twice that of the polymers from Comparative Example 1 and Comparative Example 2.

Example 8

To a 200 gallon autoclave is charged dimethyl terephthalate (111.0 pounds), dimethyl 5-sulfoisophthalate, sodium salt (3.8 pounds), dimethyl adipate (11.3 pounds), isosorbide (19.0 pounds), ethylene glycol (61.3 pounds), manganese(II) acetate tetrahydrate, (37.65 grams), and antimony(III) trioxide (13.6 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at 275° C. under full vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is found to have an IV greater than 0.35 dL/g.

The polymer is analyzed for composition with proton NMR and found to incorporate 10 mole percent isosorbide, (based on total glycols) and 10 mole percent adipate, (based on total diacids). This would suggest that 50 percent of the added isosorbide is incorporated within the polymer.

The above prepared polymer is ground to powder and subjected to a biodegradation test as detailed above. This copolyester of the present invention is expected to have a biodegradation rate at least twice that of the polymers from Comparative Example 1 and Comparative Example 2.

Example 9

To a 200 gallon autoclave is charged dimethyl terephthalate (85.8 pounds), dimethyl 5-sulfoisophthalate, sodium salt (3.8 pounds), dimethyl adipate (34.0 pounds), isosorbide (19.0 pounds), ethylene glycol (61.3 pounds), manganese(II) acetate tetrahydrate (37.65 grams), and antimony(III) trioxide, (13.6 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at 275° C. under full vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is found to have an IV greater than 0.35 dL/g.

The polymer is analyzed for composition with proton NMR and found to incorporate 10 mole percent isosorbide, (based on total glycols) and 30 mole percent adipate, based on total diacids). This would suggest that 50 percent of the added isosorbide is incorporated within the polymer.

The above prepared polymer is ground to powder and subjected to a biodegradation test as detailed above. This copolyester of the present invention is expected to have a biodegradation rate at least twice that of the polymers from Comparative Example 1 and Comparative Example 2

Example 10

To a 200 gallon autoclave is charged dimethyl terephthalate (73.2 pounds), dimethyl 5-sulfoisophthalate, sodium salt (3.8 pounds), dimethyl adipate (45.3 pounds), isosorbide (19.0 pounds), ethylene glycol (61.3 pounds), manganese(II) acetate tetrahydrate (37.65 grams), and antimony(III) trioxide (13.6 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at 275 C under full vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is found to have an IV greater than 0.35 dL/g.

The polymer is analyzed for composition with proton NMR and found to incorporate 10 mole percent isosorbide, (based on total glycols) and 40 mole percent adipate, (based on total diacids). This would suggest that 50 percent of the added isosorbide is incorporated within the polymer.

The above prepared polymer is ground to powder and subjected to a biodegradation test as detailed above. This copolyester of the present invention is expected to have a biodegradation rate at least twice that of the polymers from Comparative Example 1 and Comparative Example 2

Example 11

To a 200 gallon autoclave is charged dimethyl terephthalate (60.6 pounds), dim ethyl 5-sulfoisophthalate, sodium salt (3.8 pounds), dimethyl adipate (56.6 pounds), isosorbide (19.0 pounds), ethylene glycol (61.3 pounds), manganese(II) acetate tetrahydrate (37.65 grams), and antimony(III) trioxide (13.6 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at 275° C. under full vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is found to have an IV greater than 0.35 dL/g.

The polymer is analyzed for composition with proton NMR and found to essentially incorporate 10 mole percent isosorbide, (based on total glycols) and 50 mole percent adipate, (based on total diacids). This would suggest that 50 percent of the added isosorbide is incorporated within the polymer.

The above prepared polymer is ground to powder and subjected to a biodegradation test as detailed above. This copolyester of the present invention is expected to have a biodegradation rate at least twice that of the polymers from Comparative Example 1 and Comparative Example 2.

Example 12

To a 200 gallon autoclave is charged dimethyl terephthalate (73.8 pounds), dimethyl 5-sulfoisophthalate, sodium salt (3.8 pounds), dimethyl adipate (22.6 pounds), isophthalic acid (21.0 pounds), isosorbide (19.0 pounds), ethylene glycol (61.3 pounds), manganese(II) acetate tetrahydrate (37.65 grams), and antimony(III) trioxide (13.6 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at 275° C. under fill vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is found to have an IV greater than 0.35 dL/g.

The polymer is analyzed for composition with proton NMR and found to incorporate 10 mole percent isosorbide, (based on total glycols) and 20 mole percent adipate, (based on total diacids). This would suggest that 50 percent of the added isosorbide is incorporated within the polymer.

The above prepared polymer is ground to powder and subjected to a biodegradation test as detailed above. This copolyester of the present invention is expected to have a biodegradation rate at least twice that of the polymers from Comparative Example 1 and Comparative Example 2.

1.1 grams of this polymer is dissolved in 10.0 grams of tetrahydrofuran at room temperature. After mixing for 4 hours at room temperature, a clear solution is obtained. The solution is poured into a 2-inch diameter aluminum pan and allowed to dry at room temperature overnight. The resulting film is clear and pliable.

Example 13

To a 5 gallon autoclave is charged terephthalic acid (14.9 pounds), dimethyl 5-sulfoisophthalate, sodium salt (0.7 pounds), adipic acid (3.4 pounds), isosorbide (1.7 pounds), ethylene glycol (13.5 pounds), cobalt(II) acetate tetrahydrate (1.83 grams), and antimony(III) trioxide (3.10 grams). The polymerization autoclave is equipped with a fractional distillation column and a stirrer. The autoclave is purged tree times with nitrogen, closed under 50 psig of nitrogen pressure and heated to 265° C. over 5 hours with stirring. The pressure rises to 70 psig during this time, as esterification takes place. At the end of this time period, the pressure is vented back to psig. Water and ethylene glycol distill from the autoclave. The temperature is maintained at 265° C. Within an hour, the contents of the autoclave are a clear, viscous melt. The excess pressure in the autoclave is then vented. A solution of ethylene glycol and polyphoshoric acid (3.45 weight percent phosphorous) is pumped into the autoclave. With continued heating and stirring, vacuum is staged onto the autoclave. The autoclave is then heated to 275° C. The resulting reaction mixture is stirred at 275 C under full vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is found to have an IV greater than 0.35 dL/g. This polymer is tested for glass transition temperature by the above mentioned DSC test.

The polymer is analyzed for composition with proton NMR and found to incorporate 5 mole percent isosorbide, (based on total glycols) and 20 mole percent adipate, (based on total diacids). This would suggest that 50 percent of the added isosorbide is incorporated within the polymer.

The above prepared polymer is ground to powder and subjected to a biodegradation test as detailed above. This copolyester of the present invention is expected to have a biodegradation rate at least twice that of the polymers from Comparative Example 1 and Comparative Example 2.

Example 14

To a 200 gallon autoclave is charged dimethyl 2,6-naphthalenedicarboxylate (92.1 pounds), dimethyl 5-sulfoisophthalate, sodium salt (3.8 pounds), dimethyl adipate (45.3 pounds), isosorbide (19.0 pounds), ethylene glycol (61.3 pounds), manganese(II) acetate tetrahydrate (37.65 grams), and antimony(III) trioxide, (13.6 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at 275° C. under full vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is found to have an IV greater than 0.35 dL/g.

The polymer is analyzed for composition with proton NMR and found to incorporate 10 mole percent isosorbide, (based on total glycols) and 40 mole percent adipate, (based on total diacids). This would suggest that 50 percent of the added isosorbide is incorporated within the polymer.

The above prepared polymer is ground to powder and subjected to a biodegradation test as detailed above. This copolyester of the present invention was found to biodegrade.

Example 15

To a 200 gallon autoclave is charged dimethyl terephthalate (60.6 pounds), dimethyl 5-sulfoisophthalate, sodium salt (3.8 pounds), dimethyl adipate (56.6 pounds), isosorbide (19.0 pounds), 1,4-butanediol (75.0 pounds), and titanium (IV) isopropoxide, (19.57 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at $_{255°}$ C. under fall vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is found to have an IV greater than 0.35 dL/g.

The polymer is analyzed for composition with proton NMR and found to incorporate 10 mole percent isosorbide, (based on total glycols) and 50 mole percent adipate, (based on total diacids). This would suggest that 50 percent of the added isosorbide is incorporated within the polymer.

The above prepared polymer is ground to powder and subjected to a biodegradation test as detailed above. This copolyester of the present invention was found to biodegrade.

Example 16

To a 200 gallon autoclave is charged dimethyl terephthalate (60.6 pounds), dimethyl 5-sulfoisophthalate, sodium salt (3.8 pounds), dimethyl adipate (56.6 pounds), isosorbide (19.0 pounds), 1,3-propanediol (63.3 pounds), and titanium (IV) isopropoxide (19.57 grams). The autoclave is purged three times with nitrogen and heated to 245° C. over 4.5 hours with stirring. Over this heating cycle, over 20,000 grams of distillate is recovered. With continued heating and stirring, vacuum is staged onto the autoclave over 1.5 hours. The resulting reaction mixture is stirred at 255° C. under full vacuum, (pressure equal to or less than 2 mm Hg), for 4 hours. The vacuum is then released and the resulting reaction mixture is extruded out of the autoclave as a ribbon, the polymer ribbon is cooled and chopped.

The polymer is tested for inherent viscosity, as described above and is found to have an IV greater than 0.35 dL/g.

The polymer is analyzed for composition with proton NMR and found to incorporate 10 mole percent isosorbide, (based on total glycols) and 50 mole percent adipate, (based on total diacids). This would suggest that 50 percent of the added isosorbide is incorporated within the polymer.

The above prepared polymer is ground to powder and subjected to a biodegradation test as detailed above. This copolyester of the present invention was found to biodegrade.

Example 17

The polymer of the present invention produced in Example 1, above, is extruded as a film using a Killion PL 100 Film extrusion line. The processing conditions are as follows:

| Extruder Barrel Temperature | |
|---|---|
| zone 1 | 190° C. |
| zone 2 | 230° C. |
| zone 3 | 250° C. |
| zone 4 | 250° C. |
| Clamp ring temperature | 250° C. |
| Adaptor temperature (inlet) | 240° C. |
| Melt pump temperature | 240° C. |
| Melt pump rpm | 10 |
| Throughput | 3 lb./hr. |
| Adaptor temperature (outlet) | 230° C. |
| Extruder melt pressure | ~1500 psi |
| Die adaptor temperature | 230° C. |
| Die temperature | 230° C. |
| Die Lip temperature | 230° C. |
| Die gap | 0.25 mm (10 mil) |
| Die size | 4-inch |
| Casting temperature | 50° C. |
| Casting speed | 5 & 3 m/min. |
| Filter size | 25 microns |

The film exiting the die is 4 inches wide and 0.10 mm (4 mils) thick.

The extruded film is stretched uniaxially or biaxially using a modified Bruckner Stretching Frame (Bruckner, Siegsdorf, Germany). The sample is inserted with the machine direction (MD) on the Y axis of the machine. Draw speed is 1.50 in./sec. Typical machine settings include; Plaque preheat temp=110° C., Shutter Close Temperature= 115° C., and Emitter temperature=600° C. When a Draw ratio X (X 100%)=1 and a Draw ratio Y (X 100%)=2 is performed on the as extruded film, the film modulus and elongating at break are both significantly improved over that found for the unstretched film.

Both the as extruded film and the oriented film produced from the sulfonated aliphatic, aromatic copolyester which incorporates isosorbide of the present invention are found to have enhanced heat deflection temperature (HDT) and film sag temperature over similar films produced from the aliphatic isosorbide of the art. Both the as extruded film and the oriented film produced from the copolyester of the present invention are found to have at least twice the biodegradation rate found from similar films produced from the aromatic isosorbide polyesters of the art.

Example 18

The materials produced in Examples 1, 2, or 3, above, are injection molded into discs (thickness ⅛ inch, diameter 4 inches) and tensile bars. A Boy 30M (Boy Gmbh, Fernthalr, Germany) was used to injection mold the parts. The conditions used are as follows:

| | |
|---|---|
| Barrel temperature | 250° C. |
| Mold temperature | 50° C. |
| Screw speed | 210 rpm |
| Injection speed | 100% |
| Injection pressure | 13 bar |
| Hold pressure | 12 bar |
| Back pressure | 3 bar |
| Injection time | 2 seconds |
| Cooling time | 25 seconds |

The as molded tensile bars produced from the copolyester of the present invention are found the have enhanced tensile strength over similar tensile bars produced from the aliphatic isosorbide of the art. The as molded discs produced from the copolyester of the present invention are expected to have at least twice the biodegradation rate found from similar discs produced from the aromatic isosorbide polyesters of the art.

Example 19

The polymer produced in Example 3, above, is used to produce a 14 mil thick sheet by extrusion using a film/sheet pilot line made by Egan Machinery (Somerville, N.J.). The conditions for extrusion are as follows:

| Extruder barrel temperatures | |
|---|---|
| Zone 1 | 245° C. |
| Zone 2 | 245° C. |
| Zone 3 | 245° C. |
| Zone 4 | 245° C. |
| Zone 5 | 265° C. |
| Zone 6 | 265° C. |
| Melt line temp. | 50° C. |
| Die temp. | 260° C. |
| Roller 1 | 25° C. |
| Roller2 | 25° C. |
| Roller 3 | 20° C. |

The sheet is trimmed to 6 to 7 inches wide and approximately 11 inches long. After heating in a rectangular retaining bracket at 165° C. in a convection oven until softening takes place, the sheet is vacuum thermoformed into 1½ inch and 2 inch deep room temperature molds to demonstrate ability to thermoform. The obtained containers are optically clear and mechanically robust.

Example 20

The polymers of the present invention produced in Examples 2 and 3, above, are made into 460 mL jars on a commercial Nissei ASB100DH Injection Single Blow stretch-blow molding unit using a one-stage stretch-blow molding process, and using a 132.5 mm rod for the stretch. The polymer is injection molded at a melt temperature of 240° C. to make a preform, which is then subjected to the stretch-blow molding process at 90° C. in the same equipment without complete cooling.

The jars produced from the copolyesters of the present invention are found the have enhanced thermal properties, as seen through glass transition temperature as measured by DSC, heat deflection temperature (HDT) and sag temperature over similar jars produced from the aliphatic isosorbide of the art. The jars produced from the copolyesters of the present invention are expected to have at least twice the biodegradation rate found from similar jars produced from the aromatic isosorbide polyesters of the art.

Example 21

The polymer of the present invention produced in Example 1, above, is ground and dried at 130° C. overnight in a vacuum. Rods are made from the polymer by first placing it in a mold which is then heated under gentle pressure from a plunger. The pressure is provided by a hydraulic press. When the polymer began to soften, more pressure (500–1000 lbs/in$^2$) is applied to compress the polymer into a hard rod. The ingress of moisture is reduced by encasing the equipment in a Lucite® box which is continuously purged by a flow of dry nitrogen.

Spinning is immediately carried out on a single filament spinning machine. The polymer is rod form is melted by pressing it against a heated "grid" which is conical in shape with a hole at the apex. The machine temperatures are slowly raised until the melted polymer starts to flow through this hole. In the present example, this occurs at approximately 250° C. The polymer is then filtered through a bed of 80/120 shattered metal, and finally emerges from the single hole spinneret capillary, 0.020 inch in diameter and 0.030 inch long. The throughput is 0.30 grams per minute (gpm), and the fiber, which is to be drawn, is taken up at 50 meters per minute (mpm). These condition are found to give low orientation single filaments of about 70 denier per filament (dpf). A temperature scan is made to produce the optimum spun fiber for subsequent drawing. A fiber sample is also made at the maximum take up speed possible in order to obtain a feel for the draw down and to measure the spun fiber properties.

Single filament drawing is performed on modular draw units with hot shoes between each roll. The fiber is drawn in two stages using the second stage to develop the maximum fiber tenacity and crystallinity. In this way, a single filament is collected and small samples cut from the last roll. A sample is tested for its thermal properties by the above mentioned DSC method and for tensile properties using ASTM test method D3822.

The fiber produced from the copolyesters of the present invention are found to have enhanced thermal properties, as demonstrated through the glass transiton temperature as measured by the above mention DSC method, than found for comparable fiber produced from the aliphatic isosorbide polyesters of the art and the sulfonated aliphatic, aromatic copolyesters of the art which do not incorporate isosorbide. The fiber produced from the polymer of the present invention is expected to have an improved biodegradation rate than found for comparable fiber produced from aromatic isosorbide polyesters of the art.

While the invention has been described in the preceding Examples, there is no intent to limit the scope of the invention to the scope of those Example as one skilled in the art will understand that the invention is applicable to other combinations and materials not taught herein by specific example.

What is claimed is:

1. A sulfonated copolyester comprising the polymerization product of:
    (a) one or more aromatic dicarboxylic acids or an ester thereof;
    (b) one or more aliphatic dicarboxylic acids or an ester thereof;

(c) one or more sulfonated compound; and (d) isosorbide.

2. A copolyester as claimed in claim 1, comprising about 20 to about 98 mole percent of (a) based on total dicarboxylic acid in the copolyester, about 2 to about 80 mole percent of (b) based on total dicarboxylic acid in the copolyester, about 0.1 to about 10.0 mole percent of (c) based on total glycol or total dicarboxylic acid in the copolyester, and about 1 to about 100 mole percent of (d) based on total glycols in the copolyester.

3. A copolyester as claimed in claim 1, further formed from a dihydric alcohol.

4. A copolyester as claimed in claim 1, further formed from a polyfunctional chain branching agent.

5. A copolyester as claimed in claim 1, wherein the sulfonated compound comprises a sulfonated mono or dicarboxylic acid, or an ester or metal salt thereof.

6. A copolyester as claimed in claim 1, which has an inherent viscosity of at least about 0.15 dL/g.

7. A copolyester as claimed in claim 1, which has a rate of biodegradability at least twice that of a copolyester formed from the corresponding amount and type of said (a), (c), and (d).

8. A copolyester as claimed in claim 1, wherein the aromatic dicarboxylic acid or ester (a) is selected from the group consisting of terephthalic acid, dimethyl terephthalate, isophthalic acid, dimethyl isophthalate, 2,6-naphthalene dicarboxylic acid, dimethyl-2,6-naphthalate, and mixtures of two or more thereof.

9. A copolyester as claimed in claim 1, wherein the aliphatic dicarboxylic acid or ester is selected from the group consisting of succinic acid, dimethyl succinate, glutaric acid, dimethyl glutarate, adipic acid, dimethyl adipate, dimer acid, and mixtures of two or more thereof.

10. A copolyester as claimed in claim 3, wherein the dihydric alcohol is selected from the group consisting of ethylene glycol, 1,3-propanediol, 1,4-butanediol, poly (ethylene ether) glycols, and a mixture of two or more thereof.

11. A copolyester as claimed in claim 4, wherein the polyfunctional chain branching agent comprises a polycarboxylic acid or ester thereof or a polyhydric alcohol.

12. A copolyester as claimed in claim 4, wherein the polyfunctional chain branching agent is selected from the group consisting of trimellitic acid, pyromelletic anhydride and esters thereof, pentaerythritol and mixtures thereof.

13. A copolyester as claimed in claim 1, wherein the sulfonated compound is selected from the group consisting of sulfosuccinic acid, 3-sulfobenzoic acid, 4-sulfobenzoic acid, 5-sulfosalicylic acid, sulfophthalic acid, sulfoterephthalic acid, and 5-sulfoisophthalic acid; or an ester or salt thereof.

14. A copolyester as claimed in claim 1, wherein the sulfonated compound is in the form of a metal salt.

15. A method of improving the biodegradability and thermal properties of polyester, comprising forming the polyester from (a) one or more aromatic dicarboxylic acids or an ester thereof;

(b) one or more aliphatic dicarboxylic acids or an ester thereof;

(c) one or more sulfonated compound; and (d) isosorbide.

16. A method of preparing a copolymer as claimed in claim 1, comprising melt polymerizing components (a), (b), (c), and (d).

17. A shaped article formed at least in part from a copolyester as claimed in claim 1.

18. A film or sheet formed at least in part from a copolyester of claim 1.

19. An injection molded, compression molded, blow molded, or foamed article formed at least in part from a copolyester of claim 1.

20. A fiber formed at least in part from a copolyester of claim 1.

* * * * *